(No Model.)
C. P. RUSSELL.
SCREW CUTTING DIE.
No. 442,827. Patented Dec. 16, 1890.
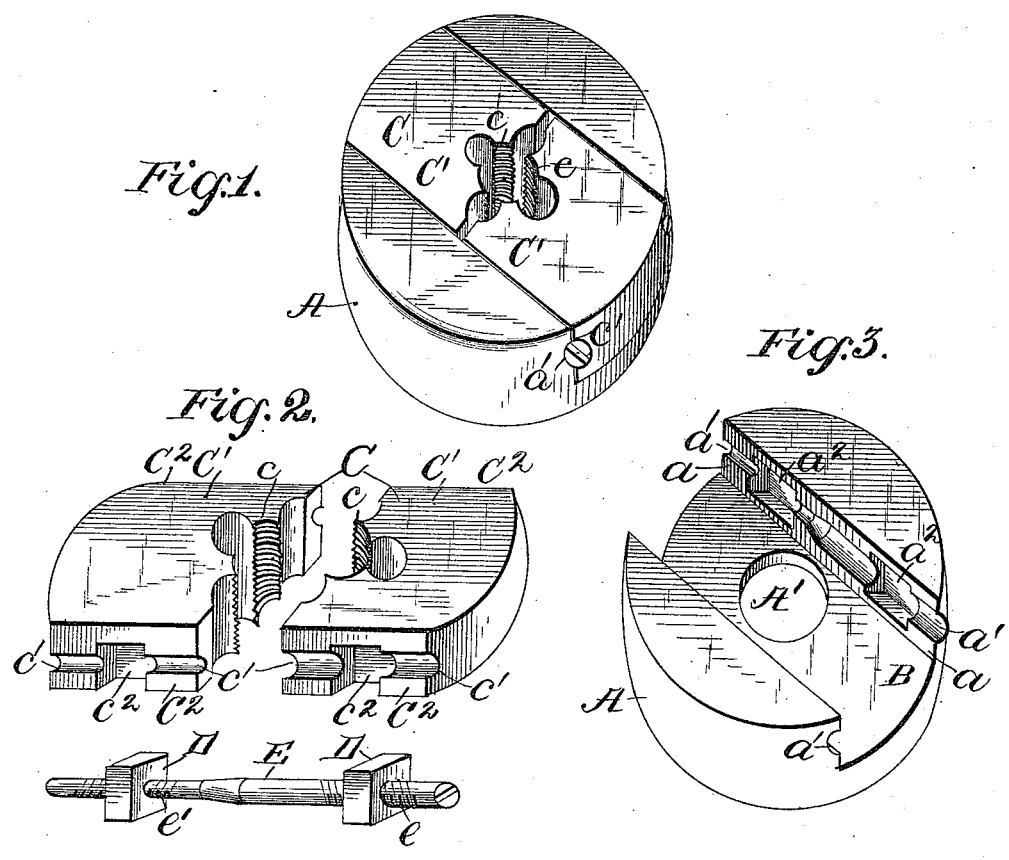
Witnesses
Inventor
Charles P. Russell,
By C. S. Whitman
Attorney

UNITED STATES PATENT OFFICE.

CHARLES P. RUSSELL, OF GREENFIELD, MASSACHUSETTS, ASSIGNOR TO THE WILEY & RUSSELL MANUFACTURING COMPANY, OF MASSACHUSETTS.

SCREW-CUTTING DIE.

SPECIFICATION forming part of Letters Patent No. 442,827, dated December 16, 1890.

Application filed February 26, 1890. Serial No. 341,821. (No model.)

*To all whom it may concern:*

Be it known that I, CHARLES P. RUSSELL, a citizen of the United States, residing at Greenfield, in the county of Franklin and State of Massachusetts, have invented certain new and useful Improvements in Screw-Cutting Dies; and I do hereby declare the following to be a full, clear, and exact description of the invention, such as will enable others skilled in the art to which it appertains to make and use the same.

My invention has for its object to provide a new and simplified construction in screw-cutting dies; and it consists of a die composed of two sections movably mounted within a slotted plate, and having screws, each screw being contained in recesses in the sides of the sections of the die, and also in recesses in the plate, and serving to adjust the relative position of the sections of the die and to retain them within the slot, as will be hereinafter more fully described and claimed.

Referring to the accompanying drawings, in which corresponding parts are designated by similar letters, Figure 1 is a perspective view of my invention, the parts being assembled together. Fig. 2 is a perspective view of the die removed from the plate, the bolt being slightly removed from its seat for the purposes of illustration. Fig. 3 is a perspective view of the plate, the die being removed therefrom.

The base-plate A has a central slot B cut across its face of sufficient depth to receive the die C, and has a central aperture A' extending from the base of the slot B to the opposite face to form a guide for the passage of the work to be threaded.

The die C is composed of two sections C' C', each section having parallel sides $C^2$, and having upon its inner end female screw-threads $c\ c$ to cut a corresponding male thread upon the work fed through the guide A'. The sections C' C' lie within the slot B, the threads $c\ c$ upon their inner ends facing each other, and by varying the distance of the threads upon each section from the corresponding threads upon the other the diameter of the male screw formed upon the work may be varied, as is well known. To afford the means for this change in the relative position of the sections of the die within the slot B, semi-cylindrical recesses $c'$ are cut in the sides $C^2$ of both sections C' C' of the die, the recesses $c'$ in each section being in line with the recesses $c'$, formed in the corresponding side of the opposite section. These recesses $c'$ on the sides of the sections of the die also register with corresponding semi-cylindrical recesses $a'$ cut in the plate A in the vertical walls $a$ of the slot B, forming cylindrical chambers, one upon each side of the die. A squared chamber $c^2$ is also formed on each side of each section of the die in line with the recess $c'$, constituting an enlargement thereof, while a corresponding chamber $a^2$ is formed in the vertical walls $a$ of the slot B to register with the chamber $c^2$, the chamber $a^2$ also being in line with the recess $a'$ in the plate A. As a chamber $a^2$ is cut in the plate A to register with each chamber $c^2$ in the die, and as there are four of these latter chambers, two on each side of the die, two chambers $a^2$ are cut in each vertical wall $a$ of the slot, one on each side of the center thereof, and in order to permit the sections of the die to play within the slot A, and yet cause the chambers $c^2$ therein to register with the chambers $a^2$ in the plate A at all times, the latter chambers are elongated, as shown in Fig. 3.

A nut D is contained within each pair of chambers $c^2\ a^2$, being prevented from turning by its corners bearing upon the sides of the squared chamber in which it is contained, while bolts E, having their heads flush with the periphery of the plate, pass through the cylindrical passages formed upon each side of the die by the recesses $c'$ and $a'$. Each bolt E has a right and left hand screw $e\ e'$ of different diameters upon its different ends, each of the said screws passing through a nut D, while the heads of the bolts are slotted to permit of their engagement by a screw-driver. By forming the opposite ends of each bolt of a different diameter their insertion into the cylindrical passages is facilitated. The chambers $c^2$ in the sections of the die have no floors, but extend down to the lower surface thereof, as shown in Fig. 2, to permit the parts to be the more readily assembled.

In order to do this, the nuts D are first placed in the chambers $a^2$ in the plate and the sections C' C' of the die inserted in the slot A, the nuts D passing into the chambers $c^2$ therein through the lower ends thereof, which are, as has been heretofore stated, open. The bolts E are then inserted in the cylindrical passages formed by the recesses c' and a', the smaller end being inserted first, which passes through the first nut and engages with the second, the direction of the female screw thereof corresponding with the direction of the male screw upon that end of the bolt. The bolt is then rotated by means of its slotted head, and the larger screw-thread upon its forward end will engage the thread of the first nut which corresponds thereto. If the rotation of the bolt be continued, the nuts will approach each other, or if the rotation of the bolt be reversed will separate, imparting a corresponding motion to the sections of the die, the elongated chambers $a^2$ of the plate permitting such a movement of the nuts. It also will be noticed that in the forms of my invention shown herein, as the bolts E F rest within the recesses a' and c' formed in both the die and the plate, they serve to retain the sections of the die within the slot, it being necessary before removing the sections of the die to remove the bolts or nuts. This construction renders keyways unnecessary and is an important feature of my invention.

Having thus described my invention, what I claim, and desire to secure by Letters Patent, is—

1. In a screw-cutting die, the combination, with a base-plate having a slot across the face thereof, the walls of the said slot being vertical, of a die consisting of two independent sections mounted in the slot, and bolts for changing the relative position of the sections of the die contained within both the plate and sections of the die and located above a portion of each of the said sections of the die, retaining the parts in position, substantially as described.

2. In a screw-cutting die, the combination, with a base-plate having a slot across the face thereof, the walls of the said slot being vertical, of a die consisting of two independent sections mounted in the slot, the vertical side walls of the slot and sections of the die having corresponding recesses therein, and bolts having a right and left handed screw working in the said recesses and located above a portion of each of the sections of the die, retaining the sections thereof within the slot, and nuts engaging the said screw and in the said sections of the die, whereby the relative position of the sections of the die may be changed within the slot, substantially as described.

3. In a screw-cutting die, the combination, with a base-plate having a slot across the face thereof, of a die consisting of two independent sections mounted in the slot, the vertical side walls of the slot and sections of the die having corresponding recesses therein, chambers contained in the said sections of the die registering with the recesses in the sides thereof, a bolt having right and left hand screw-threads extending through the said recesses and chambers, and nuts contained in the said chambers and mounted upon the said opposite threads of the bolts, whereby the sections may be caused to approach or recede from each other within the said slot, substantially as described.

4. In a screw-cutting die, the combination, with a base-plate having a slot across the face thereof, of a die consisting of two independent sections mounted in the slot, the vertical side walls of the slot and sections of the die having corresponding recesses therein, chambers formed in the sides of the sections of the die and extending to the base thereof, registering with the recesses in the side thereof, elongated chambers in the walls of the slot registering with the chambers in the sections of the die, bolts having right and left hand screw-threads upon their opposite ends extending through the said recesses and chambers, and nuts contained in the said chambers and mounted upon the said opposite ends of the bolts, whereby the sections may be caused to approach or recede from each other within the slot, substantially as described.

In testimony whereof I have affixed my signature in presence of two witnesses.

CHAS. P. RUSSELL.

Witnesses:
WM. S. WILLIAMS,
WILLIAM S. ALLEN.